Aug. 24, 1965    R. VERSLUIS    3,202,486
REACTION VESSEL WITH REFRACTORY LINING
Filed Aug. 31, 1962

INVENTOR:
ROELAND VERSLUIS
BY: *Oswald H. Milmore*
HIS ATTORNEY

United States Patent Office 3,202,486
Patented Aug. 24, 1965

3,202,486
REACTION VESSEL WITH REFRACTORY LINING
Roeland Versluis, The Hague, Netherlands, assignor to Shell Oil Company, New York, N.Y., a corporation of Delaware
Filed Aug. 31, 1962, Ser. No. 220,636
Claims priority, application Netherlands, Dec. 21, 1961, 272,802
6 Claims. (Cl. 23—284)

The invention relates to vertical, reaction vessels of the type comprising an outer metal shell, an inner lining of refractory ceramic facing bricks which are resistant to heat and/or acid, and one or more layers of insulating material situated between these bricks and the shell.

Reaction vessels of the above type are much used in industry, for example, in the petrochemical industry, e.g., in installations for the manufacture of synthesis gas, and also in the chemical industry, e.g., in the paper industry.

In such reaction vessels the support of the facing bricks frequently presents a problem since the weight of these bricks cannot be transferred to the shell via the insulating material which is generally too soft and consists, for instance, of asbestos or other soft and or brittle material on a kieselguhr base or the like. Such transference is in fact necessary whenever the reaction vessel is above a certain height, for example several times the diameter of the vessel. It is then no longer possible, especially with larger vessels, to lay or pile the bricks of the facing on each other and then employ them at the vessel interior in the form of a continuous column, concentric with the shell, which column is then supported solely by the bottom. The reason is that the bricks have no further room to expand during operation as the temperature rises when the plant is in operation and during operation the temperatures prevailing within the reaction vessel are usually higher, sometimes even considerably higher, than the normal temperature of the installation and that prevailing when the plant is shut down, this temperature then being substantially equal to the ambient temperature. Since, as stated above, these are vessels which are provided with a layer of insulating material, it is evident that in the uses under consideration here, there will always be temperature differences between the reaction space adjoining the facing bricks and the surroundings.

The facing bricks should not only be enabled to expand, but in some cases the distribution of forces should also be taken into account in connection with the specific construction of certain reaction vessels since for constructional reasons it is not always possible for the whole weight of the facing bricks to be supported by the bottom, for instance in cases where it should be possible to remove the bottom for inspection of or maintenance work in the reaction space.

Hence it has already been proposed to transfer the weight of the facing bricks to the wall of the reaction vessel. In installations used in practice the interior of the shell is provided with a metal supporting ring on which rests a ring of support bricks. These support bricks extend inwards sufficiently to enable the ring of facing bricks to be supported by the last part thereof. This type of support, however, has the disadvantage that the stresses set up by the transmission of force by the ring of supporting bricks from the facing bricks to the wall of the vessel are very unfavourable; particularly, a bending moment is exerted on the ring of support bricks. Consequently, the said bricks occasionally fractured so that the reaction vessel had to be temporarily shut down for repairs or at least extra repairs had to be made to the lining during the normal shut-downs for inspection purposes.

The object of the present invention is to overcome this drawback by providing a construction which avoids such bending stresses and prevents fracture of the support bricks resulting from the pressures exerted thereon.

According to the invention a vertical, substantially cylindrical reaction vessel, comprising a metal shell lined on the interior with refractory, viz., heat- and/or acid-resistant, facing bricks, and having one or more layers of insulating material interposed between the said bricks and the shell, is characterized in that the facing bricks are supported by at least one ring of inwardly and upwardly directed support bricks, placed at an angle to the cylinder shell in such a way that the facing bricks rest on the upper, short faces of the support bricks, while the lower short faces of the support bricks rests on an annular abutment, such as a metal support rim secured to the cylinder shell.

The annular abutment is preferably constituted by a structural angle iron forming a ring, e.g., bent to an annulus or composed of a plurality of angle irons each bent into a ring segment or straight angle irons forming the sides of a polygon, the outer rim of said iron or irons being secured to the cylinder shell. For this purpose use may be made of an equal-sided angle iron so that the support bricks resting thereon make an angle of 45° with the cylinder shell.

With the larger reaction vessels in particular, a plurality of support brick rings spaced vertically from each other is preferably mounted within the shell so that each ring supports a different annular course of facing bricks. The facing bricks are thereby supported in sections, each consisting of one or of a number of annular courses, and a space is left between the bottom of each support ring and the top course of facing bricks in the section below to allow for expansion of the bricks.

The great advantage of the construction according to the invention is that the support bricks are now almost exclusively loaded in compression, whereby fracture is almost entirely eliminated.

The invention will now be further described with reference to the accompanying drawing forming a part of this specification and showing one illustrative embodiment. In the drawing.

Figure 3:
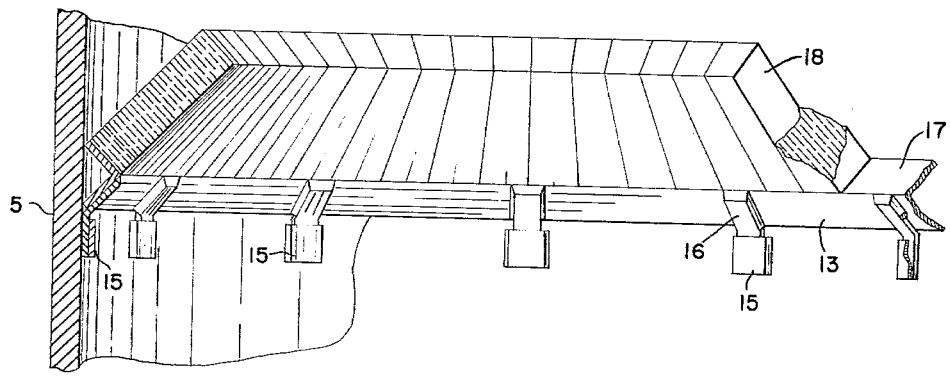
FIGURE 3 is an enlarged fragmentary sectional view showing the shell and one ring of support bricks.
Figure 1:
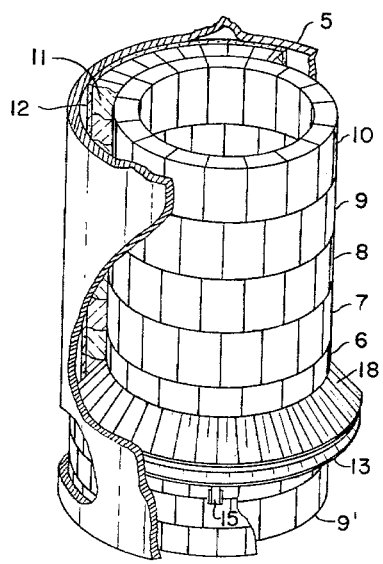
FIGURE 1 is a perspective of a part of a vessel, parts being broken away.
Figure 2:
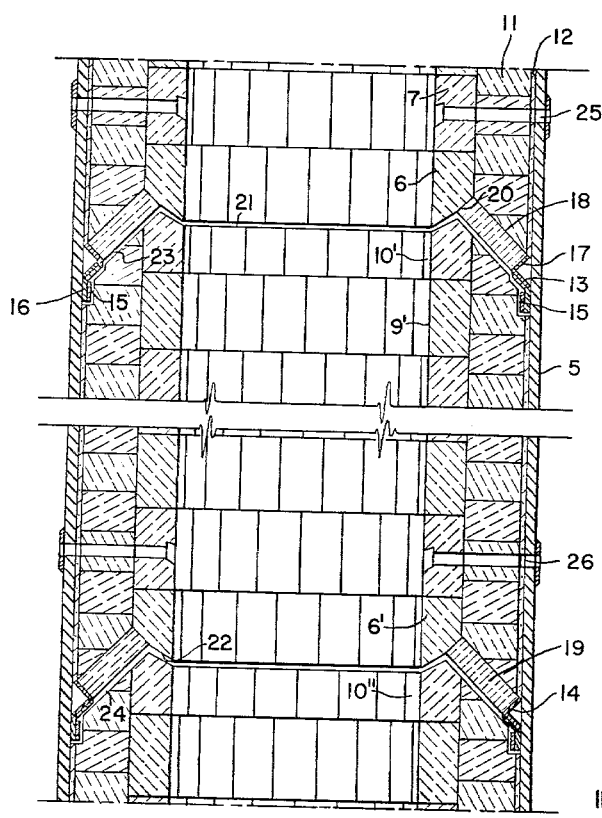
FIGURE 2 is a sectional view taken on a vertical diametric plane.

The vessel comprises an outer metal, usually steel, cylindrical shell 5 and, spaced radially inwards therefrom, a lining of refractory facing bricks which may be laid in courses such 6, 7, 8, 9 and 10, or their counterparts denoted by like primed or double-primed numbers. These bricks are acid- and/or heat-resistant, e.g., of sillimanite or refractory cement. These facing bricks continue throughout the height the vessel, both above and below the part shown. A layer of insulating material 11, e.g., in the form of blocks as shown, but optionally in any other form, such as packing, is interposed between the facing bricks and the shell adjacent to the former. The insulating material has a low heat conductivity and may, for example, be of kieselguhr, diatomaceous earth, or the like. A second layer 12 of insulating material, e.g., asbestos, may be placed between the shell and the layer 11.

Because the insulating bricks 11 are unsuited for bearing the weight of the facing bricks, being too soft and/or brittle, special must be made to support the latter. Now according to the invention transference of the weight of the facing bricks to the shell is effected as follows: Angle irons 13, 14, bent into a circular shape, are secured to the shell 5 in vertically spaced relation in any suitable manner, e.g., by clamps 15 which are welded to the shell at circumferentially spaced points. Strip-clips 16, welded to the angle irons, fit into these clamps. In the preferred embodiment shown the angle irons have equal legs and the edges of both legs adjoin the shell wall, whereby the upper legs present upwardly and inwardly directed abutment faces 17 making an angle of 45° to the vertical. Support bricks, arranged in rings 18, 19, have their lower, outer, small end faces in abutment with the ring faces 17. The large, upwardly and outwardly directed faces of these bricks are trapezoidal, and the bricks are preferably emplaced to form a tight closed ring shaped as the frustum of a cone. The inner, upper small end faces of the support bricks are in supporting relation to an annular course of facing bricks, e.g., the courses 6 and 6'. The bricks of these courses have downwardly and outwardly directed support faces 20 so that the complete annular course presents a frusto-conical face. The courses 6 through 10 constitute one section of facing bricks; it is evident that although five courses were illustrated the invention is not restricted thereto and that each section may consist of a single course. The insulating bricks 11 may also rest on the support bricks.

Thus, each ring of supporting bricks supports one section of facing bricks and the supporting bricks are loaded essentially only in compression, longitudinally between the faces 17 and 20, the only other stress being that due to the weight of the insulating bricks 11, which is low. There is no risk that the stability of the ring structure will be upset for the support bricks provide mutual lateral support; the weight of the supported section actually forces the support bricks more firmly against each other.

An expansion slot 21 or 22 is left between each pair of sections of the facing bricks to allow for expansion of the bricks resulting from high temperatures which prevail within the reaction space during operation. These slots or gaps extend beneath the inner portions of the rings 18 or 19 of support bricks and the uppermost courses 10' and 10'', respectively, of the sections next below those supported by said rings. Thereby the said uppermost courses can rise without being placed into compressive stress by abutting the support rings.

As is apparent from the drawing, gaps 23 and 24 are also advantageously provided beneath the support bricks and the top of the section of insulating bricks 11 supported from the next lower support ring, to permit the insulating bricks to expand.

A plurality of radial access holes 25, 26 extend through the shell, insulating layers and facing bricks for the introduction of instruments to measure operating variables in the reaction space.

The choice of material from which the support bricks are made, which material may be the same as for the facing bricks, depends upon the main purpose for which the facing bricks are provided. The insulating layers 11 and 12, moreover, need not be of bricks or sheet material but may be loose, such as glass wool, and the choice of material depends upon the operating conditions prevailing when the vessel is in operation.

A reactor vessel using sillimanite, a high-grade heat-resistant type of stone for the facing bricks and support bricks and constructed as described has been successfully used in various installations for the preparation of gas mixtures containing hydrogen and carbon monoxide by partial combustion of hydrocarbon with air or oxygen, at times with the supply of steam and usually at superatmospheric pressure. Temperatures higher than 1000° C. occurred in such reactions. In a typical such installation the reactants were admitted at the top and reaction products drawn off at the bottom. A typical reactor of this type has a plurality, for instance, three or more rings of support bricks spaced at approximately equal vertical distances.

I claim as my invention:

1. In a vertical reaction vessel which comprises an outer metal shell, an inner refractory ceramic lining composed of facing bricks and spaced radially inwardly from the shell, and at least one layer of insulating material interposed between said shell and facing bricks, the improvement of means for supporting said facing bricks from the shell which comprises:
    (a) means providing an annularly disposed upwardly and inwardly directed abutment face on the shell, and
    (b) a ring of support bricks in supported relation to said abutment face extending inwardly and upwardly therefrom through said layer of insulating material at an angle to the shell and having their inner and upward ends in supporting relation to said facing bricks, said supporting bricks being loaded in compression along an axis extending inwardly and upwardly from said abutment face.

2. A vessel as defined in claim 1 wherein said annularly disposed abutment face comprises at least one structural angle iron forming a ring and secured to the said shell with the legs of the angle iron inclined to the vertical.

3. A vessel as defined in claim 2 comprising annular metal rims secured to the shell and extending inwardly and upwardly in supporting relation to the structural angle iron.

4. A vessel as defined in claim 2 wherein said structural angle iron has equal legs and the edges thereof are in abutment with the shell, whereby the abutment face makes an angle of about 45° to the vertical.

5. A vessel as defined in claim 1 wherein a plurality of means providing abutment faces and a corresponding plurality of rings of support bricks are provided at different levels so that different annular courses of facing bricks are independently supported by respective rings, there being a space beneath the inner portion of each ring of support bricks and the tops of the facing bricks immediately below the facing bricks supported by said ring to allow for expansion of the facing bricks.

6. A vessel as defined in claim 1 wherein both the facing bricks and the support bricks consist of sillimanite.

References Cited by the Examiner
UNITED STATES PATENTS 2,056,732 10/36 Mekler _____ 196—133
2,463,217 3/49 Tonneson _____ 50—418

MORRIS O. WOLK, Primary Examiner.

JAMES H. TAYMAN, Jr., Examiner.